United States Patent
Bash et al.

(10) Patent No.: US 6,813,897 B1
(45) Date of Patent: Nov. 9, 2004

(54) SUPPLYING POWER TO AT LEAST ONE COOLING SYSTEM COMPONENT

(75) Inventors: Cullen E. Bash, San Francisco, CA (US); Chandrakant D. Patel, Fremont, CA (US); Gopalakrishnan Janakiraman, Sunnyvale, CA (US); Keith Istvan Farkas, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/628,284

(22) Filed: Jul. 29, 2003

(51) Int. Cl.$^7$ .............................. F25B 7/00; F25B 27/00
(52) U.S. Cl. .............................. 62/175; 62/236; 307/64; 307/80
(58) Field of Search ......................... 62/175, 236, 230; 307/62, 64, 80, 81

(56) References Cited

U.S. PATENT DOCUMENTS

| | | | | |
|---|---|---|---|---|
| 3,866,433 A | * | 2/1975 | Krug ............................ | 62/229 |
| 5,265,435 A | * | 11/1993 | Richardson ................... | 62/133 |
| 5,390,506 A | * | 2/1995 | Sogabe et al. ................ | 62/175 |
| 5,501,083 A | * | 3/1996 | Kim ........................... | 62/228.4 |
| 5,878,584 A | * | 3/1999 | Sasaki et al. ................. | 62/115 |
| 2003/0141049 A1 | * | 7/2003 | Kennedy ..................... | 165/202 |

* cited by examiner

*Primary Examiner*—Marc Norman

(57) ABSTRACT

A primary power system and a secondary power system are operable to supply power to at least one cooling system component in a cooling system. The amount of power supplied by the primary power system and the secondary power system to the at least one cooling system component is controlled based on an operating level threshold for the at least one cooling system component.

45 Claims, 10 Drawing Sheets

SUPPLYING POWER TO AT LEAST ONE COOLING SYSTEM COMPONENT

FIELD OF THE INVENTION

This invention relates generally to power systems. More particularly, the invention relates to supplying power to at least one cooling system component.

BACKGROUND OF THE INVENTION

As chip designers are continually increasing the number of transistors that may be placed on a chip, computer systems are becoming ever more powerful. Given the increase of circuit density on chips, power consumption of these computer systems is also increasing. In some instances, when a large number of computers are provided in one location (e.g., in a data center), power consumption may be several megawatts (MW). Cooling systems for the computer systems may consume 30–40% of the total power consumption. Accordingly, cooling systems should be considered when designing a power system for the computer systems.

Computer systems often utilize a cooling system for removing heat dissipated by components of the computer systems (e.g., one or more processors, memory, power supplies, and other circuits). Excessive heat tends to adversely affect the performance and operating lives of these components. In recent years, these components have become denser and, hence, generate more heat during operation. Furthermore, when a plurality of computer systems are housed in one enclosure (e.g., a rack or cabinet) and/or stored in the same location (e.g., a data center), there is an even greater potential for the adverse effects of overheating.

In order to substantially guarantee proper operation, and to extend the life of the computer systems, it is necessary to maintain the temperatures of the components within predetermined safe operating ranges. Subjecting the components to temperatures above recommended maximum operating temperatures may result in irreversible damage to the components. In addition, it has been established that the reliabilities of computer system components decrease with increasing temperature. Therefore, the heat dissipated by the components during operation must be removed at a rate that ensures that operational and reliability requirements are met. Cooling systems are used to remove heat generated by the computer system components.

Cooling systems may include fans, air conditioning units, cooling liquid, etc., to facilitate heat dissipation. One type of conventional cooling system for computer systems is a heating, ventilating, and air-conditioning system (HVAC system). Some of the power consuming components of an HVAC system include compressors, blowers, and pumps. These components tend to consume a significant portion of the total power consumption of the cooling system.

Power systems for computer systems and cooling systems are typically designed to meet the maximum power demand of a load and for redundancy. While these factors are important in power system design, energy efficiency is an equally important factor that is usually not given the same weight as other factors when designing power supplies.

FIG. 6 illustrates a conventional power supply 500 modeled as a black box with power entering the black box (input power) and conditioned power (output power) exiting the black box. Conditioning may include alternating current (A/C) or direct current (D/C) conversions (e.g., AC/AC, AC/DC, DC/DC, etc.), and the like. Ideally, there would be no losses between the input power and the output power. However, in reality, losses occur during the conditioning, typically as heat dissipation. Efficiency of a power supply may be measured as the ratio of output power over input power. For example, if 100 Watts (W) are input to the power supply 500 and 75 W of conditioned power exits the power supply 500, the power supply has 75% efficiency. 25 W of heat may be dissipated by the power supply 500. The efficiency of a power supply is usually provided by a manufacturer, but may also be measured. Energy efficiency of other power system components may similarly be determined.

FIG. 7 illustrates an exemplary efficiency curve for an AC/DC power supply input power at 200 Volts (V) and 60 Hertz (Hz). The efficiency curve of FIG. 7 may be provided by the power supply manufacturer or determined through power measurements. Referring to the efficiency curve of FIG. 7, the power supply is approximately most efficient (e.g., approximately 80%) with a power output between 400 W and 450 W. Conventional power systems for computer systems use at least two power supplies for redundancy, whereby each power supply is operable to meet the power demand of the computer systems unilaterally in is case of failure of one of the power supplies. However, for the majority of their operation, both power supplies are operational and are usually designed to split the load. Therefore, if the computer systems demand 400 W, the power supplies each only operate at approximately 74% efficiency (e.g., each power supply supplying an output power of approximately 200 W at 74% efficiency per power supply). If three power supplies are used, each of the power supplies only operates at approximately 64% efficiency. Therefore, conventional power systems for computer systems typically sacrifice efficiency for other factors (e.g., redundancy), which leads to increased energy costs.

Power factor is another important characteristic related to energy efficiency of power system components, which impacts the sizing of the electrical wires and equipment that supply energy to a power supply and the cost of electricity. Power factor is the ratio of real power over apparent power (see Equation 1).

$$\text{Power Factor} = \text{real power}/\text{apparent power} \quad \text{Equation (1)}$$

Power factor is based on the type of load on the power supply. A purely resistive load has a power factor of 1, which is ideal, because the real power is equal to the apparent power. However, for non-purely resistive loads, real power is less than apparent power, lea ding to power factors less than 1. As the difference between apparent and real power increases (i.e., with smaller power factors), more current must be generated by the power source in order to deliver a specific amount of real power to the load. For example, in a system with a power factor of 0.5, to deliver 100 W of real power (10 Amps at 10 Volts) requires the power source to provide 20 Amps at 10 Volts. In a load with a sinusoidal voltage and current, the real power is equal to the product of the RMS input voltage (V), input current (1), and cos ($\phi$), where cos ($\phi$) is the phase angle between the voltage and the current. Cos ($\phi$) is the power factor.

The difference between apparent and real power impacts the cost of power system components that supply power to a computer system or cooling system, because all the electrical components upstream of a power supply must be sized for a higher current. In addition, because all components dissipate some heat when current passes through them, higher currents translate into greater power wastage. To offset this cost and the cost of the greater power wastage, electrical utilities charge, in general, more for electricity provided to lower power factor loads.

Typically, power supplies for computer systems may have a power factor between 0.6 and 0.8. A poor power factor may be the result of a large amount of reactive power caused by an inductive load. The output power of a power supply can be modeled based on power factor and efficiency (see Equation 2).

$$\text{Output Power} = \text{efficiency} * \text{power factor} * \text{apparent power} \quad \text{Equation (2)}$$

FIG. 8 illustrates an exemplary power factor curve for the power supply having the efficiency curve shown in FIG. 7. The power factor curve shown in FIG. 8 may be provided by a manufacturer (e.g., based on a predetermined load) or may be calculated from power measurements. Based on this power factor curve, a higher power factor is achieved generally as output power of the power supply is increased. Power factor correction circuits are generally used to improve power factor. However, power factor is typically not considered when optimizing the efficiency of a power supply or power system.

SUMMARY OF THE INVENTION

According to an embodiment, a method of supplying power to at least one cooling system component comprises determining an operating level threshold for the at least one cooling system component, wherein the operating level threshold is one of a plurality of operating levels for the at least one cooling system component; and supplying power to meet the power demand of the at least one cooling system component using one or more of a primary power system and a secondary power system based on whether an operating level of the at least one cooling system component exceeds the operating level threshold.

According to another embodiment, a system comprises a first power system and a second power system operable to supply power to a at least one cooling system component. A power delivery control device is connected to the first power system and the second power system, wherein the power delivery control device is operable to control an amount of power supplied by the first power system and the second power system to the at least one cooling system component based on an operating level of at least one cooling system component.

According to another embodiment, a power delivery control device controls an amount of power supplied by a first power system and a second power system to at least one cooling system component. The device comprises a memory configured to store at least one threshold associated with an efficient operating point of the at least one cooling system component, and a power control circuit configured to compare one or more of power to consumption of the at least one cooling system component and an operating level of the at least one cooling system component to the at least one threshold. The power control circuit is further configured to control the amount of power supplied by the first power system and the second power system to the at least one cooling system component based on the comparison to the at least one threshold.

According to another embodiment, a system comprises cooling system component means for cooling at least one computer system and means for determining an operating level threshold for the cooling system component means, wherein the operating level threshold is one of a plurality of operating levels for the cooling system component means. The system further comprises means for supplying power to meet the power demand of the cooling system component means using one or more of a primary power source means and a secondary power source means based on whether an operating level of the cooling system component means exceeds the operating level threshold.

BRIEF DESCRIPTION OF THE DRAWINGS

The present invention is illustrated by way of example and not limitation in the accompanying figures in which like numeral references refer to like elements, and wherein.

DETAILED DESCRIPTION OF EMBODIMENTS

According to an embodiment, at least a primary power system and a secondary power system are operable to supply power to one or more cooling system components in a cooling system. Power is supplied to the cooling system using the primary power system or the secondary power system or both power systems. A variety of factors, including power efficiency of the cooling system components, cost of electricity from each power system, efficiency of components in each power system, availability of power from each power system, etc., may be used to determine whether to use one power system or both power systems, or to determine how much power to supply from each system.

The cooling system may comprise an HVAC system including a compressor, pump and/or a blower for cooling computer systems. These components of an HVAC system are responsible for a substantial majority of the power demand of the cooling system, and can be monitored to determine the power demand of the cooling system. However, power consumption of other known components of the HVAC system may also be measured to determine the power demand of the cooling system. The power demand of one or more components of the cooling system and/or operating levels of the components of the cooling system may be used to determine whether to use one or both power systems.

In one embodiment, the power demand of the cooling system is determined by aggregating a measured power consumption of each of the cooling system components. In another embodiment, the power demand of the cooling system is determined by measuring the power supplied to the cooling system components from the primary power system and the secondary power system. The power demand may be determined using power measuring circuits.

Figure 7:
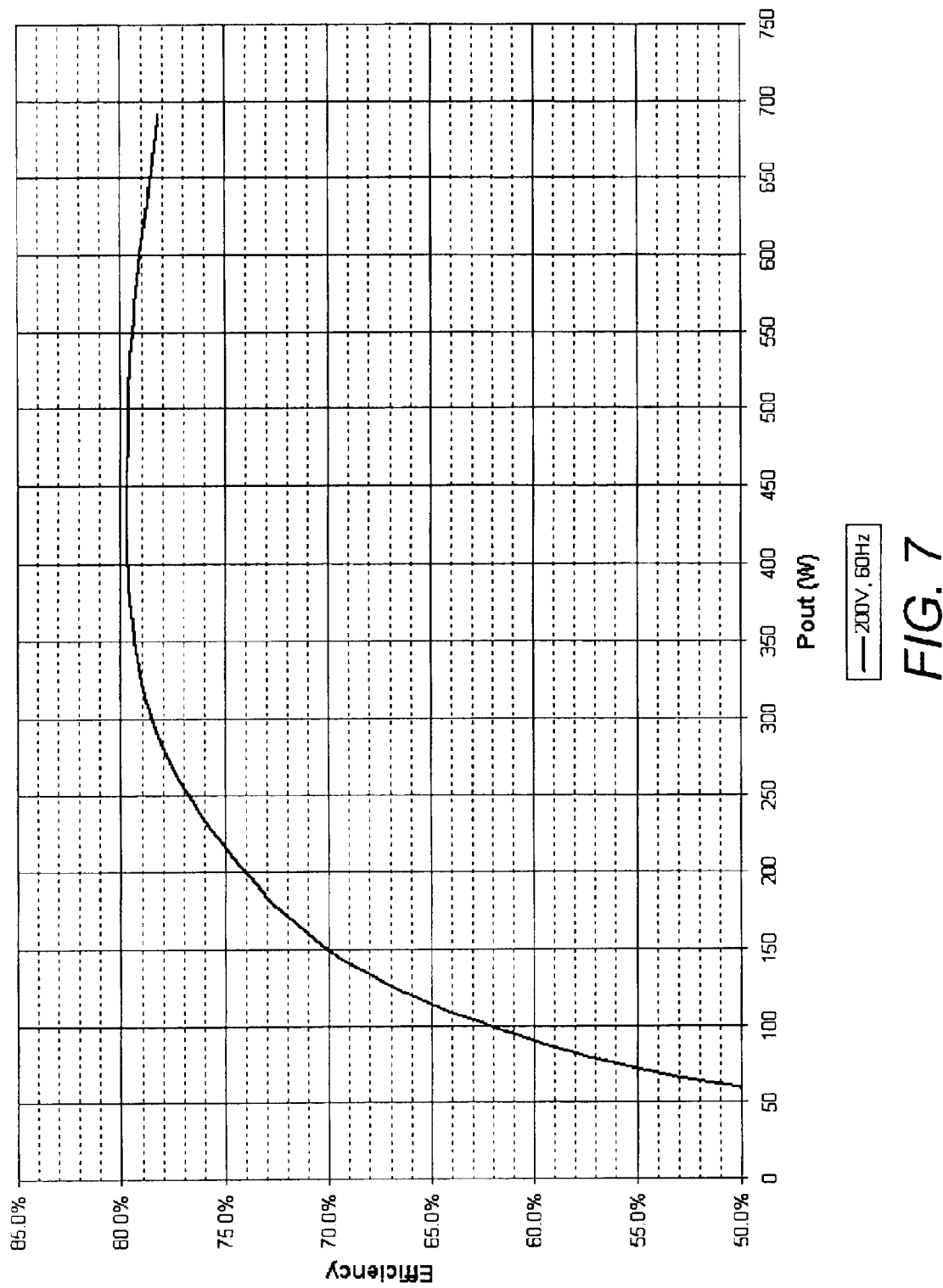
FIG. 7 illustrates an efficiency curve for a power supply.

The efficient operating point of one or more components in the primary and secondary power systems may be a factor for controlling the amount of power supplied by the primary power system and the secondary power system. Efficiency of a power system component may be based on an efficiency curve and/or a power factor curve for a component of the power system. For example, a power efficiency curve may be used to identify one or more output powers where a power supply is most efficient. Referring to FIG. 7, for example, the power supply having this efficiency curve is most efficient outputting power between 400 W and 450 W (i.e., a range of output powers). If the output power falls below 400 W or is greater than 450 W, then the power supply is determined to be operating outside its efficient operating point. Also, the efficient operating point may be based on output powers where the power supply is substantially most efficient. Referring to the power efficiency curve in FIG. 7, output powers where the power supply is substantially most efficient may include 350 W to 550 W. The load on the power supply may be increased or decreased to achieve a power output within the range (i.e., operating the power supply at the efficient operating point). The efficient operating point may be a particular value, e.g., 450 W, instead of a range. Also, an upper and lower threshold (e.g., 450 W and 400 W, respectively) may be used to determine when the primary power supply is operating outside the efficient operating point. The difference between the upper and lower threshold provides a buffer that substantially prevents the secondary power supply from continually switching on and off or continually changing its output power. For example, if the power demand of the cooling system exceeds the upper threshold, the secondary power shares the load to maintain the primary power supply at its efficient operating point. If the power demand falls below the lower threshold, the secondary power supply may lower its output power or stop supplying power to the cooling system.

Figure 8:
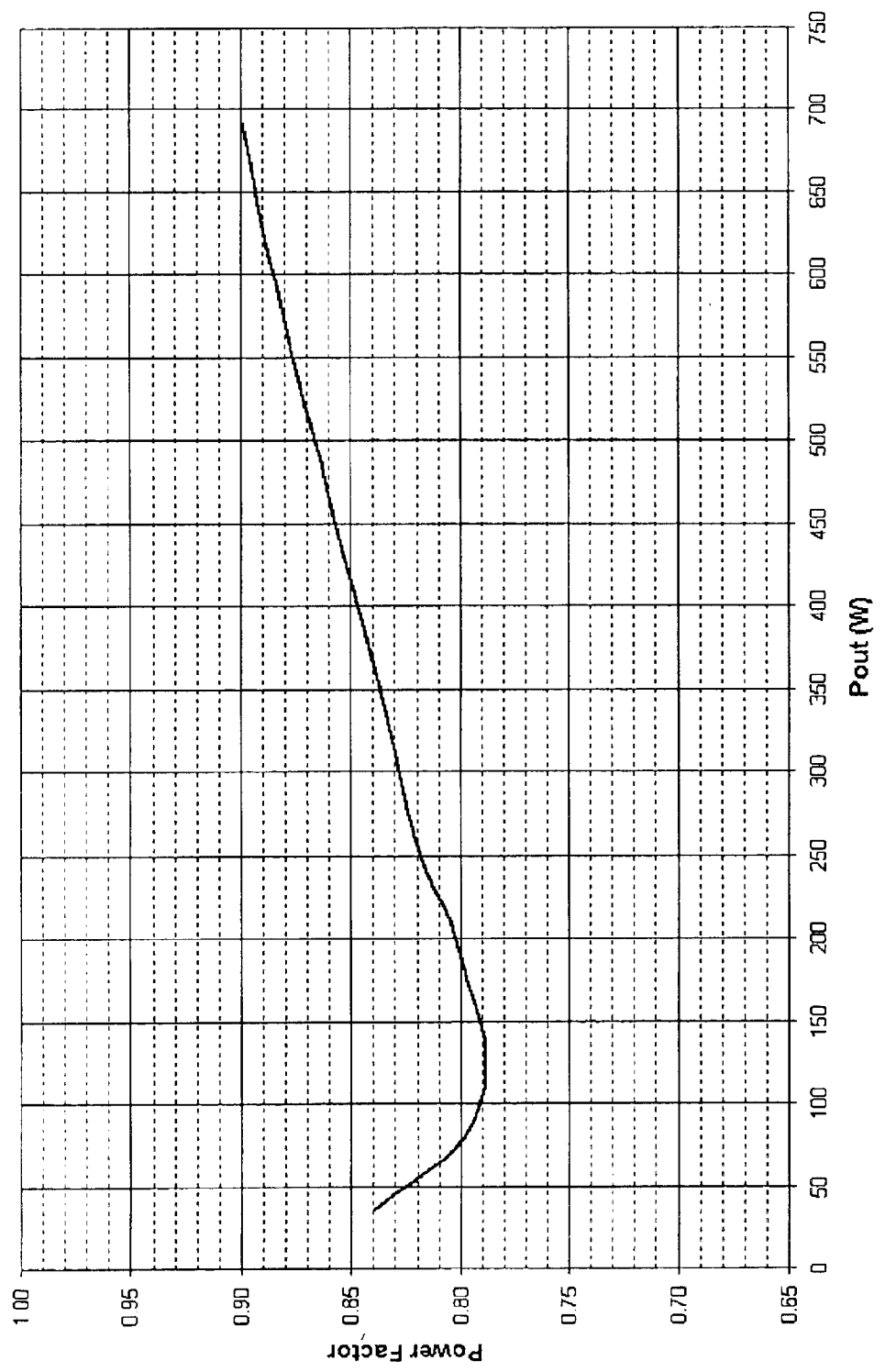
FIG. 8 illustrates a power factor curve for a power supply.

Power factor may be used to determine an efficient operating point. Power factor is the ratio of the real power over the actual power. The efficiency of a power supply increases as the power factor approaches one. FIG. 8 illustrates a power factor curve for the power supply having the efficiency curve shown in FIG. 7. The power factor is highest at an output power of approximately 680 W and a power factor of approximately 0.89. The power factor for the power supply may be periodically or substantially continuously calculated. A power factor threshold may be used to determine when the power supply is operating outside its most efficient operating point. The threshold, for example, may be set at 0.85. Therefore, when the power factor falls below 0.85, the load on the power supply may be increased or decreased. The efficient operating point may also be based on a range of power factors where the power supply is substantially most efficient.

Efficiency of other components (e.g., upstream from a power supply or instead of a power supply) in the power system may also be determined. For example, a power supply may be connected to a power distribution unit (PDU), which also has an efficiency curve. Also, the power supply may be most efficient at an output power of 100 W. However, the PDU may require a larger load to reach its efficient operating point. Then, the efficient operating point of the power system may be increased (e.g., 120 W output power) to allow the PDU to achieve its efficient operating point. Therefore, the overall efficiency of the power system may be increased.

In another embodiment, energy costs may be a factor for controlling the amount of power supplied by the primary power system and the secondary power system For example, if the cost of electricity supplied by the primary power system is significantly high when compared to the cost of electricity generated from the secondary power system, which may receive power from alternative energy sources (e.g., wind power, solar power, etc.), then the power system able to supply power at a cheaper rate may service a substantial portion of the load. For example, if the cost of electricity is 30 cents per kilowatt hour (kwh) (e.g., supplied via the primary power system from a power utility) and the cost of electricity is 20 cents per kwh from the secondary power system, the majority of the power demand of the cooling system is met by the secondary power system if sufficient power is available from the secondary power system.

The amount of power that can be provided by the secondary power system may be considered if it is substantially limited, for example, when compared to the availability of power from the primary power system, which may receive power from a power utility company. For example, solar energy may be used as a low cost energy source (e.g., supplying power to the secondary power system). The power generated from solar energy may be stored in fuel cells, however, the amount of power stored is limited. Accordingly, based on the availability of the low cost energy supply, the amount of power supplied by the low cost supply may be increased or decreased.

According to another embodiment, factors, such as the power efficiency of the cooling system components and using a lower cost energy source when the cooling system components are operating at levels resulting in increased power consumption, may be considered. Certain components of a cooling system may be monitored for operating level and/or power consumption. In an HVAC system including a compressor, pump and/or a blower for cooling computer systems, these components are responsible for a substantial majority of the power demand of the cooling system, and can be monitored to determine the power demand of the cooling system. Other components may also be monitored, however, at least the components consuming the largest amount of power should be monitored.

Referring, for example, to the pump, blower, and compressor, these components may function at different operating levels. For example, the blower may operate at different speeds. A higher speed may be required to cool increased dissipation. Similarly, the pump and compressor may operate at higher operating levels when the amount of heat dissipation increases. These components generally consume more power as their operating level increases. At certain operating levels, however, the amount of power consumption significantly increases. For example, a variable frequency drive (vfd) blower may require a certain amount of power (e.g., 12 kilowatts (KW)) to operate the blower at its highest speed (also referred to as full capacity). However, to operate the blower at 50% full capacity, the vfd blower may only require 10% of the power (e.g., 1.2 KW) needed to operate the blower at full capacity. This represents a significant power savings in that a 50% reduction in blower speed results in a 90% decrease in power demand by the blower. Thus, a significant increase in power consumption may result at operating levels above 50% capacity. The 50% capacity may be selected as the threshold operating level for the vfd blower. Similarly, threshold operating levels may be selected for the pump and the compressor. Accordingly, an operating level threshold for a cooling system component is selected based on a power consumption efficiency of the cooling system component, which varies at different operating levels.

When one or more of the threshold operating levels are exceeded, the secondary power system (i.e., being supplied from the lower cost energy source) is used in conjunction with the primary power system to meet the power demand of the cooling system components. The amount of power supplied by the secondary power, for example, may be the amount of power needed to operate the cooling system components when functioning at operating levels above their respective operating level thresholds. Ideally, most of the power demand is met by the lower cost energy source. However, because of the possibility of having a limited amount of power available from the lower cost energy source, power supplied from the higher cost energy source may be provided when the cooling system components function above their respective operating level thresholds.

In another related embodiment, the power consumption of each of the cooling system components operating at their threshold operating levels is determined. These power consumptions are aggregated, and the aggregated power consumption is used to compare to a threshold. When this threshold is exceeded, power is supplied from the secondary power system, which receives power from the energy source that supplies power at a cheaper rate (i.e., the lower cost energy source).

Figure 1:
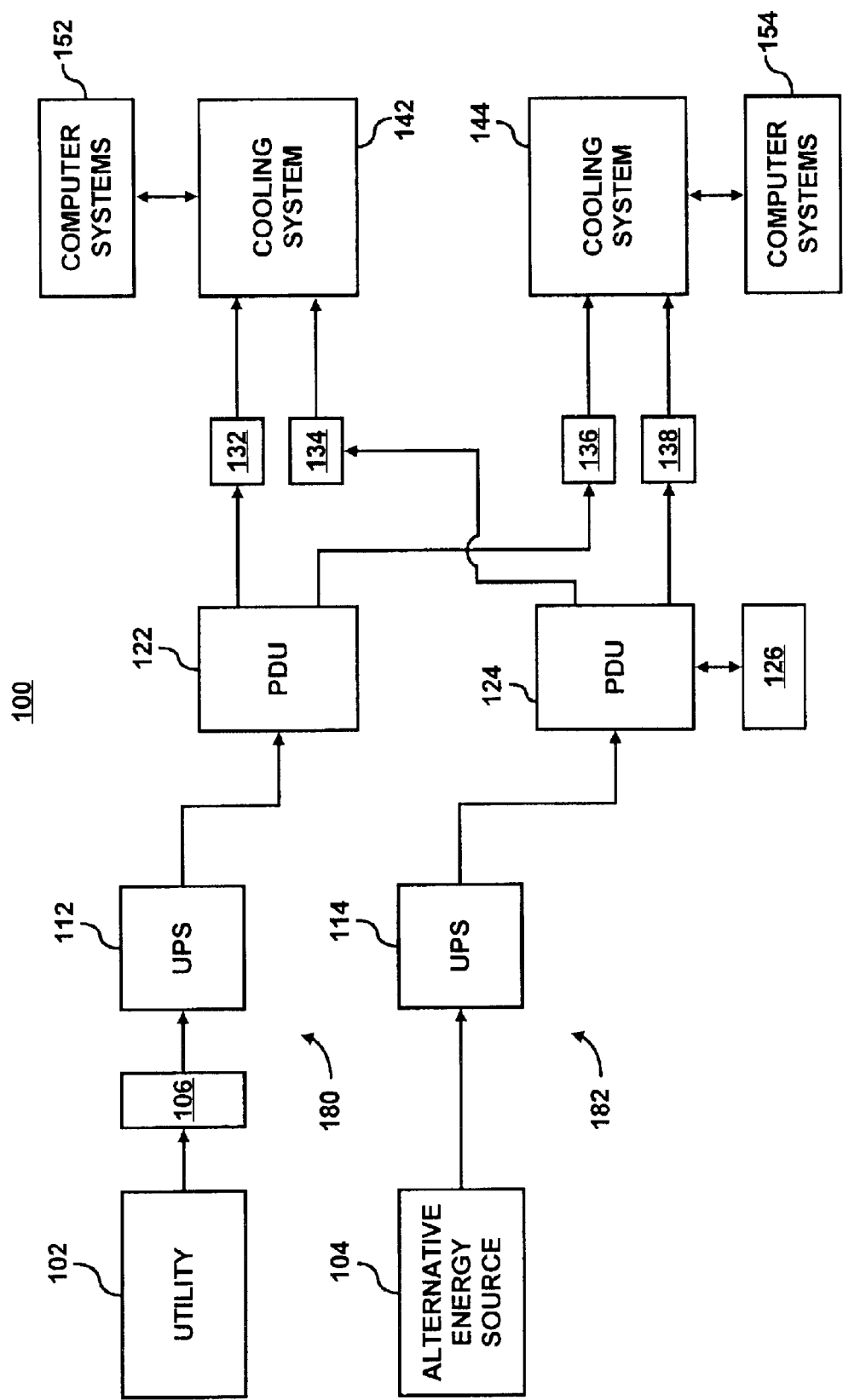
FIG. 1 illustrates a block diagram of a power system, according to an embodiment of the invention.

FIG. 1 illustrates a block diagram of an embodiment of a power system 100, which may be used to supply power to the cooling systems 142 and 144. The power system 100 comprises a power utility 102 supplying unconditioned power to loads. The power utility 102, for example, may make 12 to 16 megawatts (MW) available to a particular load, such as the computer systems 152 and 154 and the cooling systems 142 and 144. The power utility 102 is connected to a power distribution system 106, which may include power lines, switches, transformers, etc. for distributing and conditioning power. The power distribution system 106 may be connected to an uninterruptible power source (UPS) 112, which may provide uninterrupted power for at least a predetermined period of time to a load. For example, an 8 MW UPS 112 may provide power at full load in response to a failure, such as an interruption in received power from the power distribution system 106. The UPS 112 may be connected to one or more generators and/or batteries (not shown) to supply power in case of an interruption in received power from the power distribution system 106. Generators may allow the UPS to supply power for a considerable length of time when power from the utility 102 is unavailable.

The UPS 112 is connected to a power distribution unit (PDU) 122, which supplies power to the power supplies 132 and 136. The PDU 122 may include AC/AC power supplies, etc,.to step down voltage of power supplied to the power supplies 132 and 136. The PDU 122 may be connected to several power supplies, not shown, and may include circuit breakers, power failure alarms, etc. The PDU 122 may distribute power to the cooling systems 142 and 144 or the power supplies 132 and/or 136 may be used to distribute power to the cooling systems 142 and 144. Similarly, the PDU 124 may distribute power to the cooling systems 142 and 144 or the power supplies 134 and/or 138 may be used to distribute power to the cooling systems 142 and 144. Although the power supplies 132–138 are not shown as connected to the computer systems 152 and 154, the power supplies 132–138 may also supply power to the computer systems 152 and 154. Alternatively, other power supplies (not shown), which may be connected to the PDUs 122 and 124 may be used to supply power for the computer systems 152 and 154. The computer systems 152 and 154 may include a single computer system, such as a standalone server or personal computer, or multiple computer systems, such as server blades, etc.

The power supplies 132–138 may include AC/DC conversion, and the like. Components of the cooling systems 142 and 144 generally use AC power supplied by the PDUs 122 and 124, however, DC power is available via the power supplies 132–138 for cooling system components that may use DC power. In one embodiment, at least the power supplies 132 and 136 may have the efficiency curve and the power factor curve, shown in FIGS. 7 and 8 respectively. In other embodiments, the power supplies 132–138 may be designed to produce much higher or much lower output power, other than shown in FIG. 7, depending on the load being serviced by the power supplies 132–138. The power supplies 132–138 may include power supplies in a rack, cabinet or other enclosure, and the power supplies 132–138 may supply power to cooling systems, servers, and other electrical devices housed in the enclosure. In this instance, the power supplies 132–138 may be responsible for providing at least 10 kW of power for up to 40 components in a rack. Alternatively, the power supplies 132–138 may only supply power to the cooling systems 142 and 144, which may include 30–40% of the power consumption of the electrical devices in the rack.

The system 100 may also include an alternative energy source 104. The alternative energy source 104 may include fuel cells, wind power, solar power, etc. The alternative energy source 104 is connected to a UPS 114, which provides uninterrupted power to the PDU 124. The PDU 124 conditions the power and distributes power to the power supplies 134 and 138, which supply power to the cooling systems 134 and 138. The PDU 124 may also supply power to the computer systems 152 and 154.

Although not shown, the alternative energy source 104 may distribute power via a power distribution system, similarly to the power distribution system 106, if necessary (e.g., when the alternative energy source 104 produces substantially unconditioned power similarly to the power utility 102 and/or is located a substantial distance from the UPS 114). Also, the alternative energy source 104 may be directly connected to the PDU 124 or the power sources 134 and 138, especially with respect to using the fuel cells 126. In addition, the alternative energy source 104 may be connected to the PDU 122. However, full redundancy is achieved by connecting the alternative energy source 104 to the cooling systems 142 and 144 via the separate UPS 114 and PDU 124. Unlike the utility 102, the alternative energy source 104 may not be available to generate power substantially all the time, such as when wind power, solar power or possibly hydroelectric power is used. In these instances, power generated by the alternative energy source 104 may be stored, for example, using the fuel cells 126. The fuel cells 126 may comprise batteries, fly wheels or other devices operable to store energy for later use. The fuel cells 126, although limited in the amount of energy that can be stored, increase the availability of power supplied by the alternative energy source 104. The fuel cells 126 may be directly connected to the alternative energy source 104 or the UPS 114, instead of or in addition to the PDU 124.

In one embodiment, the UPS 112 and 114, the PDUs 122 and 124, the power supplies 132–138, the cooling systems 142 and 144, and the computer systems 152 and 154 may be housed in a data center (not shown). The data center may contract with the power utility to receive a predetermined amount of power (e.g., up to 16 MW), and the power is distributed via the power system components shown in FIG.

1 to the cooling systems 142 and 144. The alternative energy source 104, such as wind and solar, may be provided by a utility company or may be connected directly to the data center. For example, solar panels or windmills may be directly connected to the data center via power conditioning equipment (not shown) to provide clean power to the data center at a predetermined voltage.

According to an embodiment, power system components (e.g., distribution system 106, UPS 112, PDU 122, power supplies 132 and 136) connected to the utility 102 comprise the primary power system 180 and power system components (e.g., UPS 114, PDU 124, fuel cells 126, power supplies 134 and 138) connected to the alternative energy source 104 comprise the secondary power system 182 for supplying power to the cooling systems 142 and 144 and the computer systems 152 and 154.

The power efficiency of components in the primary power system 180 and the secondary power system 182 may be considered when supplying power using one or more of the primary power system 180 and the secondary power system 182. For example, when the power demand of the cooling systems 142 and/or 144 is high, the power supplies 132 and 136 may not be able to operate at their most efficient operating points to meet the high power demand of the cooling systems 142 and 144. The secondary power supplies 134 and 138 partially supply power to the cooling systems 142 and 144 to allow the primary power supplies to continue to operate at their most efficient operating point. For example, the load on the secondary power supply 134 may be approximately equal to an amount of power exceeding the amount of power output by the power supply 132 operating at its efficient operating point and needed to meet the power demand of the cooling system 142. The secondary power supplies 134 and 138 are shown as receiving power from the alternative energy source 104. However, the power system 100 may be designed such that the secondary power supplies 134 and 138 may also be connected to the utility 102 via UPS 112 and PDU 122 or via a different PDU (e.g., the PDU 124 if connected to the utility 102) and/or a different UPS (e.g., the UPS 114 if connected to the utility 102).

The primary power supplies 132 and 136 may have different characteristics than the secondary power supplies 134 and 138. For example, the secondary power supplies 134 and 138 may have a lower maximum output power, or the secondary power supplies 134 and 138 may be designed to have an efficiency curve that allows the secondary power supplies 134 and 138 to operate at their efficient operating points while sharing the load with the primary power supplies 132 and 136.

The cooling systems 142 and 144 are operable to cool the computer systems 152 and 154, respectively. The cooling systems 142 and 144 remove heat dissipated by the computer systems 152 and 154 to substantially maintain an optimum operating temperature for the computer systems 152 and 154.

Figure 2A:
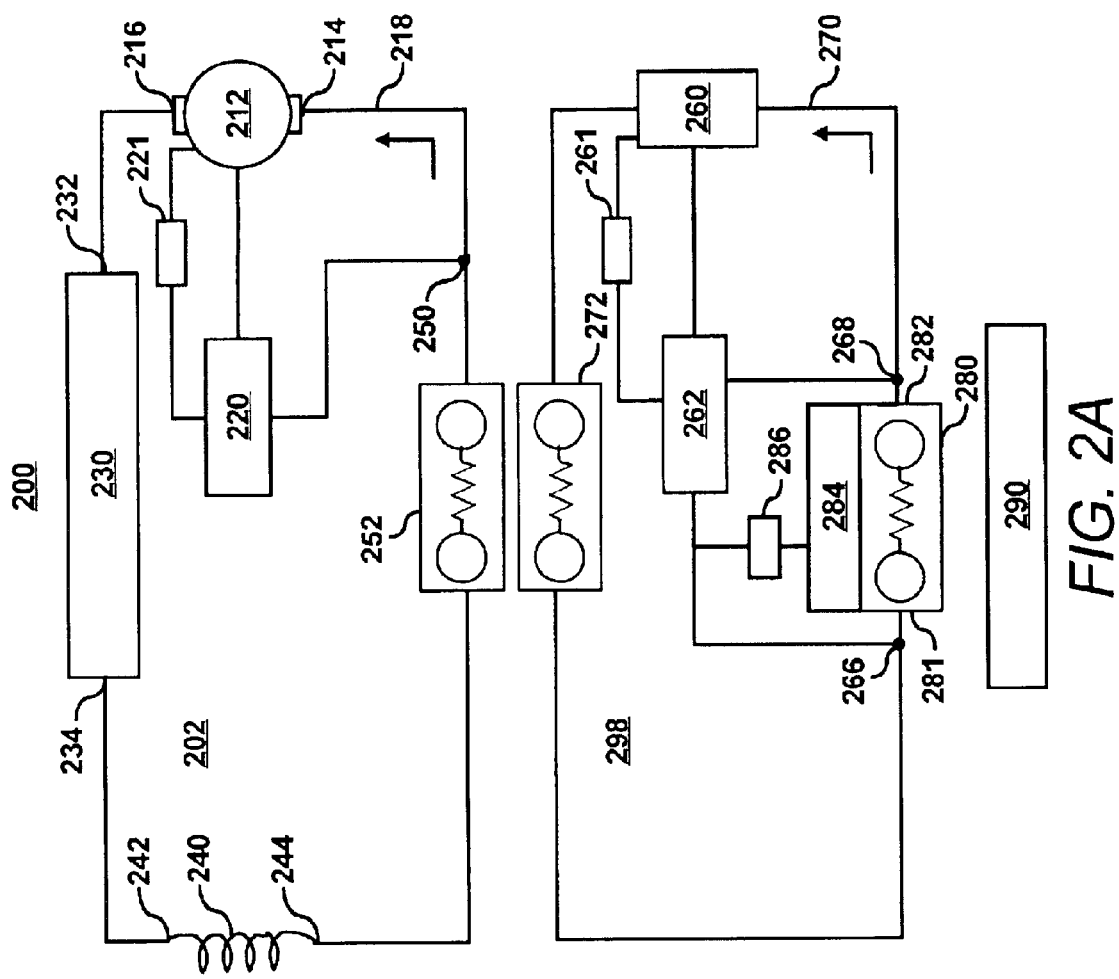
FIGS. 2A–B illustrate block diagrams of cooling systems, according to embodiments of the invention.
Figure 2B:
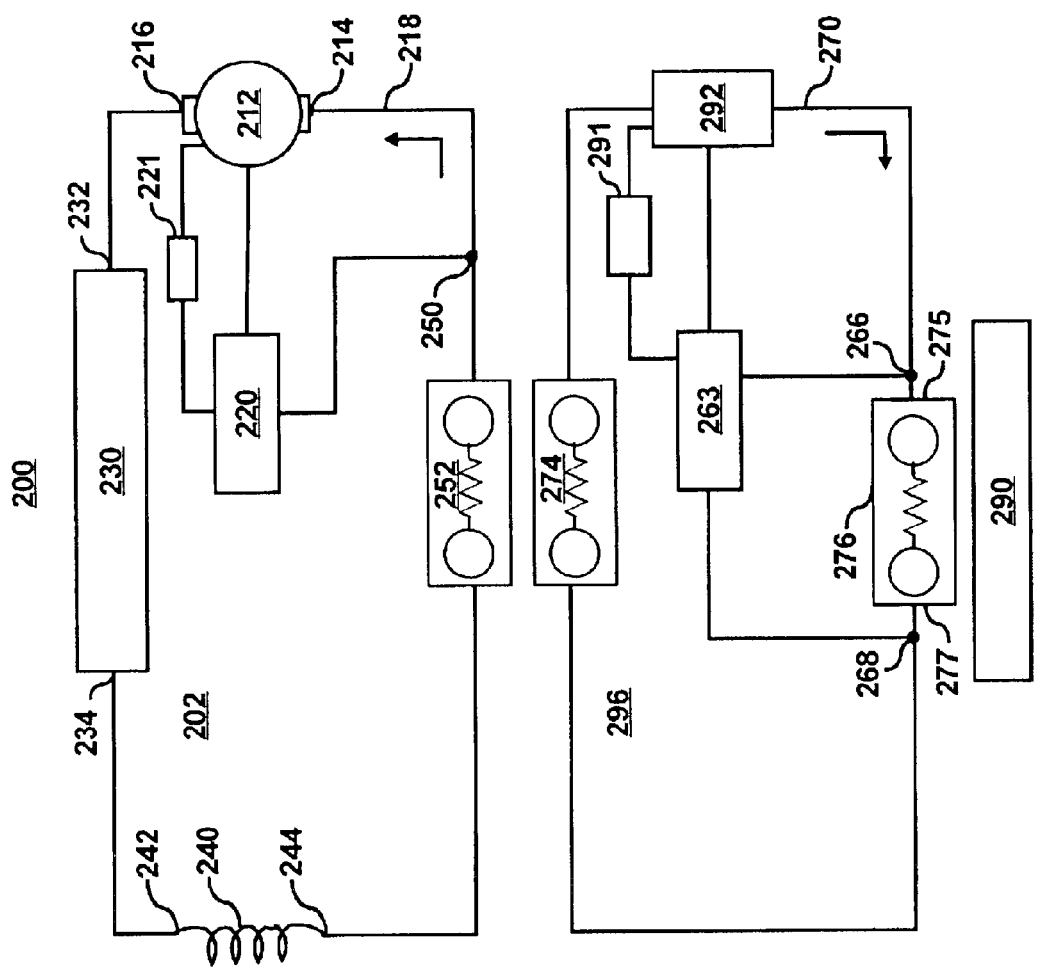

The cooling systems 142 and 144 may provide cooling using an air-cooled system, a liquid-cooled system, and the like. In one embodiment, the cooling systems 142 and 144 comprise HVAC systems. FIGS. 2A–B illustrate embodiments of HVAC systems which may be used in the cooling systems 142 and 144. The HVAC systems shown in FIGS. 2A–B are described below with respect to the cooling system 142 of FIG. 1 by way of example and may be used for the cooling system 144 and other cooling systems.

FIG. 2A illustrates an HVAC system 200 for cooling heat generating components 290, for example, of the computer systems 152. The HVAC system 200 includes a refrigeration system 202 and a liquid cooled system 298. The refrigeration system 202 is a closed loop refrigeration system that cools cooling fluid flowing through the closed loop cooling fluid system 298. The cooling fluid, in turn, removes the heat dissipated by the components 290 of the computer systems 152 to maintain the computer systems 152 at a desired temperature.

The refrigeration system 202 may include an evaporator 252, a compressor 212, a condenser 230, and an expansion valve 242. The condenser 230 and the expansion valve 242 may include any number of known or heretofore known condensers and expansion valves and thus includes any type of condenser and expansion valve which substantially adequately performs their respective functions within a refrigeration system. Examples of expansion valves suitable for use with the present invention include capillary tubes, constant pressure expansion valves, and the like.

Additionally, any suitable type of refrigerant may be utilized in the refrigeration system 202. In fact, the choice of refrigerant will depend upon a plurality of factors, e.g., cooling requirements, environmental impact, cost, etc. Generally speaking, suitable refrigerants include the suite of vapor compression hydrocarbon refrigerants (CFCs, HCFSs, HFCs or any blend of pure refrigerants). Specific examples of suitable refrigerants include R134a, R290, R600, etc.

Moreover, suitable refrigerants may be obtained from any commercial refrigerant manufacturer (e.g., TONG TAI INTERNATIONAL located in Taiwan, R.O.C.).

Refrigerant enters the variable capacity compressor 212 through a compressor inlet 214. The variable capacity compressor 212 increases the pressure and temperature of the refrigerant before the refrigerant exits through a compressor outlet 216. The speed of the compressor 212 and thus the level of compression of the refrigerant may be controlled by a controller 220. According to an embodiment, the controller 220 controls the compressor 212 to increase or decrease the flow rate of the refrigerant flowing through the system 202 based on the heat dissipated by the components 290. For example, the flow rate of the refrigerant may be generally proportional to the amount of heat dissipated by heat generating components 290 of the computer system 152. Thus, flow rate of the refrigerant may be increased or decreased as the heat dissipated by the components 290 increases or decreases.

The refrigerant flows out of the compressor 212 and through the refrigerant line 218 into the condenser 230 through a condenser inlet 232. Within the condenser 230, the refrigerant begins to decrease in temperature while remaining at a constant pressure until the refrigerant reaches a saturation point. The refrigerant exits the condenser 230 through a condenser outlet 234, typically as a liquid (still at a relatively high pressure and temperature). The refrigerant then flows through the refrigerant line 218 into an expansion valve 240 through an expansion valve inlet 242. The pressure of the refrigerant is reduced and cooled within the expansion valve 240.

After exiting the expansion valve 240 through an expansion valve outlet 244, the refrigerant flows through an evaporator 252. The evaporator 252 is a heat exchanger that transfers heat from the cooling fluid in the cooling fluid system 298 to the refrigerant, thereby cooling the cooling fluid. The evaporator 252 may be proximally located to the heat exchanger 272 connected to the supply line 270 carrying the cooling fluid in the cool fluid system 298, which allows heat to be transferred to the refrigerant from the cooling fluid. The refrigerant then flows out of the evaporator 252 to the compressor 212.

According to an embodiment, the controller 220 is connected to a temperature sensor 250 detecting the change in temperature of the refrigerant flowing out of the evaporator 252. The controller 220 may control the compressor 212 to increase or decrease the flow rate of the refrigerant depending on the increase or decrease in temperature of the refrigerant. For example the controller 220 may periodically store the temperature measured by the sensor 250. When the change in temperature exceeds a predetermined amount, the controller 220 increases or decreases the flow rate of the refrigerant accordingly. Also, the amount of change in flow rate may be relative the amount of change in temperature.

As described above, the controller 220 controls the compressor based on the sensed evaporation temperature. In other embodiments, the controller 220 may control the compressor 212 based on other sensed temperatures. For example, the temperature at the inlet of the evaporator 252 may be used to control the compressor. Also, the difference in temperature between the temperature of refrigerant exiting the evaporator 252 and the temperature of refrigerant entering the evaporator 252 may also be used by the controller 220 to control the compressor 212.

It will be apparent to one of ordinary skill in the art that the refrigeration system 202 may be modified to meet different cooling system specifications. For example, a single speed compressor may be used instead of a variable speed compressor. In this instance, the compressor may run at a substantially high speed based on the maximum heat dissipation of the components 290. Also, multiple compressors and multiple evaporators may be used depending on the capacity of the cooling system 200 that is needed to cool the computer systems 152. Furthermore, the cooling system 202 is a simplified diagram of a refrigeration system, and other components of a refrigeration system, known in the art, may be used in the cooling system 202.

The cooling fluid system 298 comprises a liquid-cooled, closed loop system. Cooling fluid (e.g., water, a mixture of ethylene glycol and water mixed in a predetermined ratio, or some other suitable liquid selected for its heat absorbance and transfer characteristics, and/or its non-corrosive characteristics) flows through a cooling fluid line 270 (e.g., pipes, etc.). A pump 260 controls the flow rate of the cooling fluid flowing through the cooling fluid system 298. According to an embodiment, the controller 262 controls the speed of the pump 260 based on the amount of heat dissipated by the components 290. For example, the cooling fluid flows through a heat exchanger 280 (e.g., cold plates) where heat is transferred from the components 290 to the cooling fluid. A temperature sensor 266 proximate an inlet 281 of the heat exchanger 280 measures the temperature of the cooling fluid entering the heat exchanger 280, and a temperature sensor 268 proximate to an outlet 282 of the heat exchanger 280 measures the temperature of the cooling fluid exiting the heat exchanger 280. The difference in temperature of the heated cooling fluid at the outlet 282 and the cooler cooling fluid at the inlet 281 can be used to calculate the heat dissipation of the components 290.

A blower 284 is shown as connected to the heat exchanger 280. In one embodiment, the blower 284 may be included in another closed loop, similar to the closed 296 described with respect to FIG. 2B, which includes air heated by the components 290. The heated air is circulated by the blower 284 in the closed loop, past the heat exchanger 280. Heat from the air is transferred to the liquid in the system 298. The operating level of the blower 284, which may be based on the amount of heat dissipated by the components 290, may be controlled by the controller 262 or another controller not shown. Also, the power consumption of the blower 284 may be measured by the power measuring circuit 286.

Equation (1) may be used to calculate heat dissipation Q of the components 290 based on the change in temperature of air or liquid heated by the components 290.

$$Q = \dot{m} C_p (Tout - Tin) \qquad \text{Equation (1)}$$

Tout and Tin may be measured. For example, temperatures sensors 268 and 266 measure Tout and Tin, respectively, for the liquid in the system 298. Similar measurements may be performed for air, such as shown with respect to system 296 in FIG. 2B. In equation (1) $\dot{m}$ is the mass flow of air (e.g., for system 296) or liquid (e.g., for system 298). $C_p$ is the specific heat capacity of air (e.g., for system 296) or liquid (e.g., for system 298).

Based on equation (1), the controller 262 calculates the amount of cooling fluid (which may include air or liquid depending on the type of system) needed to cool the components 290. For example, the controller 262 controls the pump 260 to provide the necessary amount of cooling fluid based on the heat dissipated by the components 290, and a similar determination may be performed for the blower 284. It will be apparent to one of ordinary skill in the art that the cooling system 298 may be modified to meet different cooling system specifications. For example, multiple pumps and multiple cooling plates may be used. Furthermore, the cooling system 298 is a simplified diagram of a liquid-cooled system, and other components, known in the art, may be used in the cooling system 298, such as valves (e.g., mixing valves, 3-way bypass valves, Griswald valves, etc.) and the like. Furthermore, the controller 262 may control these components to further control flow rate of the cooling fluid.

FIG. 2B illustrates another embodiment of the cooling system 142. In this embodiment, the refrigeration system 202 described above and shown in FIG. 2A may be used. However, instead of a liquid-cooled system, an air-cooled system 296 is provided. The air-cooled system 296 comprises a blower 292 controlling the flow rate of air in the system 296. The blower 292 distributes the air through the system 296. The blower 292, for example, may be a blower driven by a variable frequency drive (vfd) (also referred to herein as a vfd blower).

The air is heated as it flows past the components 290. For example, if the components 290 are housed in a slot in a rack, air flows through an inlet 275 and out of an outlet 277 of an enclosure 276, which may include walls in the rack for the slot. The air is heated by the components 290. Temperature sensors 266 and 268 at the air inlet 275 and the air outlet 277, respectively, may be used to determine the heat dissipation of the components 290. Equations (1) and (2) may be used by the controller 263 to calculate heat dissipation and flow rate, such as described above. According to an embodiment, the controller 263 may control the speed of the blower to change the flow rate of the air based on the calculated heat dissipation of the components 290.

The heated air continues to flow in the system 296 past the evaporator 252. The heat from the air is transferred to the refrigerant in the cooling system 202 via the evaporator 252 and a heat exchanger 274, and thus the air is cooled. It will be apparent to one of ordinary skill in the art that the cooling system 296 may be modified to meet different cooling system specifications. For example, multiple blowers may be used. Furthermore, the cooling system 298 is a simplified diagram of an air-cooled system, and other components, known in the art, may be used in the cooling system 296, such as louvers, valves, and the like. Furthermore, the controller 263 may control these components to further control flow rate of the air.

The primary power system 180 and the secondary power system 182 of FIG. 1 are operable to supply power to at least the compressor 212, the pump 260, the blower 284, and the blower 292 and possibly other components of the HVAC system 200. If the power demand of these components exceeds a threshold, then the secondary power system 182 shares the power demand of the cooling system 200.

The threshold may be determined based on a number of embodiments described herein. In one of those embodiments, the amount of power supplied by the primary power system 180 and the secondary power system 182 is based on the power demand of the cooling system components. For example, an operating level threshold is determined for the compressor 212, the pump 260, and the blower 292, shown in FIGS. 2A–B. An operating level threshold may be based on an operating level where the power consumption of the component begins to increase significantly (e.g., 50% of full capacity for the blower 292, 50% of full capacity for the pump 260, 60% of full capacity for the compressor, etc.). The controller 220 determines the current operating level of the compressor 212, and the controllers 262 and 263 determine the current operating levels of the pump 260 and the vfd blower 292, respectively. If any of the current operating levels exceeds a respective operating level threshold, then the secondary power system 182 is used in conjunction with the primary power system 180 to meet the power demand of the cooling system components. The secondary power system 182 may supply power from a lower cost energy source, so cost savings for the increased power demand is achieved by using the secondary power supply. Also, the amount of power supplied by the secondary power system 182 to, for example, the cooling system 142, may be approximately equal to the amount of power needed to meet the power demand of the cooling system components when operating above a respective operating level threshold.

To reduce costs, the majority of the power demand of the cooling system components may be met by the secondary power system 182 supplying power at a cheaper rate. Accordingly, if any of the current operating levels exceeds a respective operating level threshold, then the secondary power system 182, used alone or in conjunction with the to primary power system 180, may supply power to meet the power demand of the cooling system components. However, if the amount of power available from the lower cost energy source is limited, then the secondary power system 182 may meet a smaller portion of the power demand of the cooling system components (e.g., an amount of power approximately equal to the amount of power needed to meet the power demand of the cooling system components when the primary power supply is operating at its efficient operating point).

In a related embodiment, the power consumption of each of the cooling system components operating at their threshold operating levels is determined. These power consumptions are aggregated, and the aggregated power consumption (i.e., the aggregate power threshold) is used as the efficient operating point of the primary power system 180. When this efficient operating point is exceeded, power is supplied from the secondary power system 182, which receives power from the lower cost energy source. The controllers 220, 262, and 263 may determine when the threshold operating levels are exceeded or when the aggregated power consumption of related cooling system components exceeds a threshold. These functions may also be performed by the power delivery device 310, shown in FIG. 3. In this instance, the controllers 220, 262, and 263 may transmit current operating levels and/or current power consumption to the power delivery device 310. The power delivery device 310 may compare current operating levels to respective thresholds and/or compare current power demand of the cooling system components to, for example, the efficient operating point of the primary power supply 132 based on the aggregate power threshold.

The power consumption of the compressor 212, the pump 260, the blower 284, and the blower 292 may be measured by the respective controllers 220, 263, and 262. For example, the controllers 220, 263, and 262 may be connected to power measuring circuits 221, 261, 286, and 291 for measuring power consumption. The power measuring circuits 221, 261, and 291 are optional, and power consumption may be determined using different methods. For example, the output power of the primary power supply 132 and the secondary power supply 134 may be measured. Also, the controllers 220, 263, and 262 determine the operating levels of the compressor 212, the pump 260, the blower 284, and the blower 292. A table may be used to convert an operating level to a power consumption value. Respective operating level/power consumption pairs may be determined by previous measurements.

Figure 3:
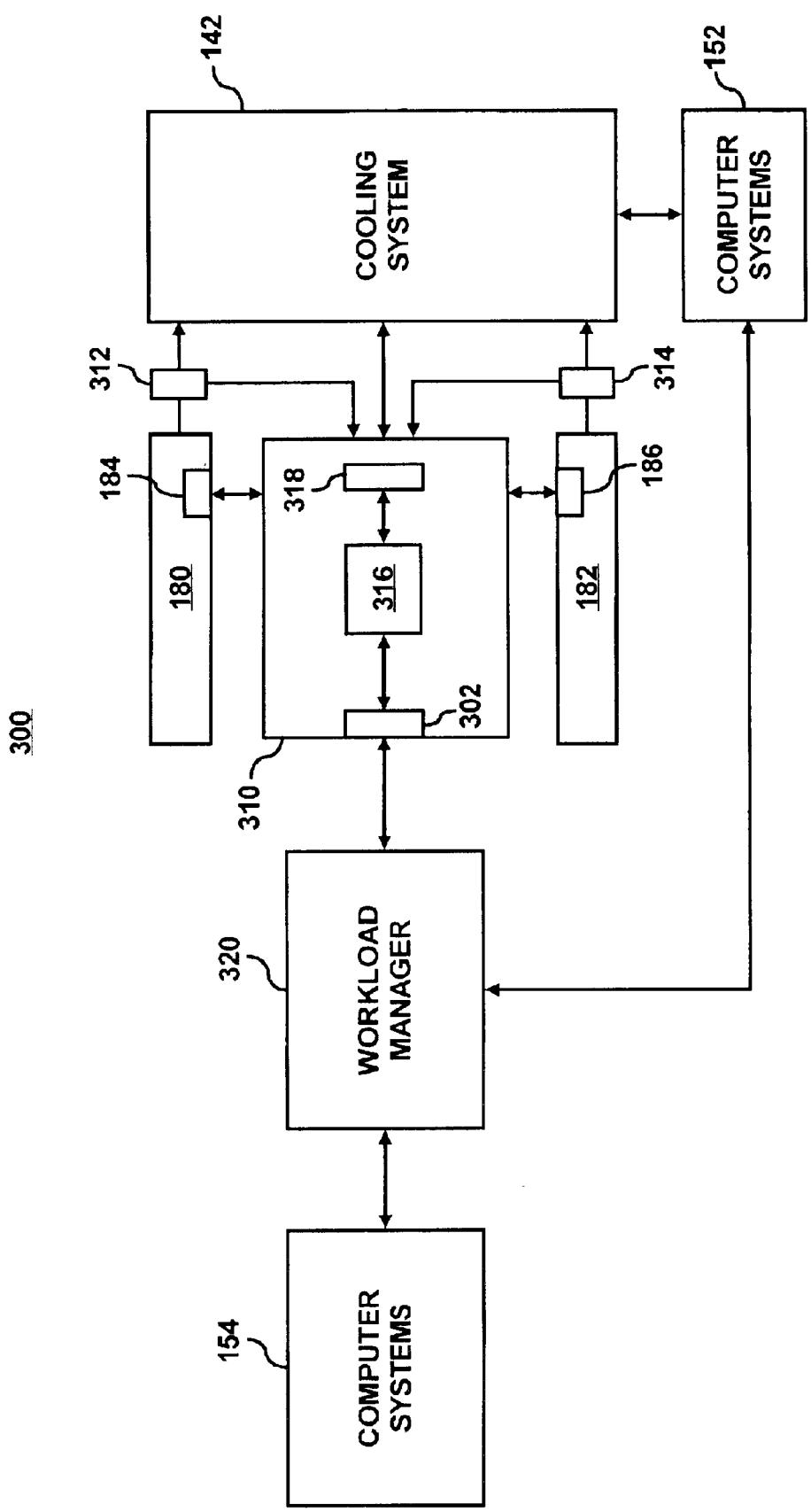
FIG. 3 illustrates a block diagram of a power control system, according to an embodiment of the invention.

FIG. 3 illustrates a power control system 300 operable to control the load on the primary and secondary power system 180 and 182, according to an embodiment of the invention. The power delivery device 310 may include conventional power measuring circuits 312 and 314 for measuring the load on the power systems 180 and 182 supplying power to the cooling system 142. The power delivery device 310 may include a controller 316 or the like and memory 318 for storing and executing software for controlling the amount of power supplied by the power systems 180 and 182. For example, the controller 316 may transmit a signal to another controller or circuitry (184 and/or 186) connected to a PDU or power supply in the power systems 180 and 182 instructing the controller or circuit 184, 186 to increase or reduce the output power. Also, the power delivery device 310 may include a network interface 302 for communicating with the workload manager 320. A similar power delivery device may be used for the cooling system 144.

The power delivery device 310 may control the amount of power supplied to the cooling system 142 from the power systems 180 and 182 based on the power demand of the cooling system 142, operating levels of the cooling system components, etc. Thresholds associated with these factors may be stored in the memory 318 for controlling the amount of power supplied by the power system 180 and 182. For example, operating level thresholds, power demand thresholds, power system component efficiencies, etc. may be stored in the memory 318.

In one embodiment, if the output power of the primary power system 180 exceeds a threshold (e.g., based on efficiency of one or more components of the primary power system 180), then the power delivery device 310 determines that the load (i.e., the power demand of the one or more computer systems 142) of the primary power system 180 should be reduced to allow the primary power system 180 to operate at its efficient operating point. Then, the power delivery device 310 controls the secondary power system 182 to supply power to the cooling system 142. The power delivery device 310 calculates the amount of power the secondary power system 182 needs to supply to the cooling system 142. The amount of power supplied by the secondary power system 182 may be approximately equal to an amount of power exceeding the output power of the primary power system 180 when operating at its efficient operating point.

If, for example the power demand of the cooling system 142 decreases, the power delivery device 310 reduces the load on the secondary power system 182. In some instances, the secondary power system 182 may be idle if the power demand of the cooling system 142 is sufficiently low that the primary power system 182 is operating at or below its efficient operating point.

The power delivery device 310 is also operable to increase the power demand of the computer systems 152 if, for example, the output power of the primary power system 180 is below the threshold and the secondary power supply is off. According to an embodiment, the cooling systems 142 and 144 provide an amount of cooling to the computer systems 152 and 154 respectively based on the amount of heat being dissipated by the computer systems 152 and 154. Accordingly, the amount of cooling fluid provided to the computer systems 152 and 154, is relative to the amount of heat being dissipated by the computer systems 152 and 154.

Typically, the amount of heat being dissipated by the computer systems 152 and 154 is relative to the workload of the computer systems 152 and 154. Therefore, the workload of the computer systems 152 and 154 may be relative to the power demand of the respective cooling systems 142 and 144. For example, if the workload of the computer systems 152 is substantially increased, the cooling system 142 may use more power to cool the computer systems 152 because the increased workload causes the computer systems 152 to dissipate more heat. Likewise, if the workload is substantially decreased, less power may be needed to cool the computer systems 152.

The workload manager 320 monitors and stores the workload of the computer systems 152 and 154. The workload manager 320 may instruct the computer systems 152 and 154 to execute or stop executing applications to control the workload of the computer systems 152 and 154. If, for example, the power demand of the cooling system 142 is low, then one or more applications may be migrated from the computer systems 154 to the computer systems 152. The power delivery device 310 may transmit a request to the workload manager 320, for example, to increase the workload of the computer system 152 if the primary power system 180 is operating below its efficient operating point (e.g., the power output of the primary power system 180 is below the threshold). The workload manager 320 may migrate one or more applications from the computer systems 154 to the computer systems 152. For example, one or more applications scheduled to execute or are currently executing on the computer systems 154 are executed by the computer systems 152. As a result of increasing the workload on the computer systems 152, more heat is dissipated and more power is used by the cooling system 142 to cool the computer systems 152. Therefore, the output power of the primary power system 180 is increased to at least the efficient operating point, assuming that a majority of the power demand of the computer systems 152 is met by the power system 180.

The power delivery device 310 may also transmit a request to the workload manager 320 to reduce the workload of the computer systems 152. In some instances, the power demand of the cooling system 142 may exceed the output power of the primary power system 180 operating at the efficient operating point and the output power of the secondary power system 182, for example, operating above an efficient operating point or near a maximum output power capacity. In these instances, when the excessive power demand is sustained for a predetermined period of time, the power delivery device 310 requests the workload manager 320 to reduce the workload of the computer systems 152 (thereby reducing the power demand of the cooling system 142).

The workload manager 320 may migrate some of the workload to one of the computer systems 154 receiving power from one or more other power supplies (e.g., the power supplies 136 and 138). Therefore, the power demand of the cooling system 142 is reduced. Also, the workload manager 320 may migrate workload from one of the computer systems 152 to another one of the computer systems 152, which may be more efficient with a heavier workload. For example, if one of the computer systems 152 is operating at 55% efficiency and increasing the workload for that computer system increases the efficiency to approximately 80%, then the workload is migrated to that computer system.

Also, the workload manager 320 may consider other global factors when migrating workload. For example, the current cooling load of multiple cooling systems in a data center may be monitored. Workload may be increased for a computer system being cooled by a cooling system operating below a predetermined level. Also, workload may be decreased for a computer system being cooled by cooling system operating above predetermined level.

The workload manager 320 may also invoke placing one or more components of the computer systems 152 and 154 in a lower-power state to reduce heat dissipation, resulting in the respective cooling systems 142 and 144 reducing power consumption. For example, if the cooling system 142 includes one or more cooling system components operating above predetermined thresholds, then the operating level of these cooling system components may be reduced if the respective computer system is operable to reduce its heat dissipation by placing one or more of the computer system components in a lower-power state. The workload manager 320 may request the power delivery device 310 to place one or more components (e.g., of the computer system 152) in a lower-power state to reduce heat dissipation. This may comprise reducing microprocessor speed, shutting down a floating point unit, shutting down a cache or other storage device, etc. The workload manager 320 may also invoke placing one or more components, previously placed in a lower-power state, in a higher power state, if operating levels for the cooling system components fall below a predetermined threshold. In another embodiment, the power delivery device 310, instead of the workload manager 320, may determine whether components of the computer system 152 may be placed in a lower-power state or a higher-power state, and accordingly instruct the computer system 152 to change the power state of the components.

In yet another embodiment, the power delivery device 310 may allocate load for the power systems 180 and 182 based on energy costs. For example, if the cost of power from the utility 102, shown in FIG. 1, is substantially higher than the cost of power from the alternative energy source 104, shown in FIG. 1, then the power delivery device 310 allocates more load to the secondary power system 182 instead of the primary power supply 182.

In other embodiments, the power delivery device 310 may allocate the load between the primary power system 180 and the secondary power system 182 based on whether one or more components of the cooling system exceed respective operating level thresholds. One or more controllers (e.g., the controllers 220, 262, and 263 shown in FIGS. 2A–B) may determine the operating levels of one or more cooling system components. The controllers may determine when a cooling system component exceeds an operating level threshold, or the controllers may transmit current operating levels to the power deliver device 310. The power delivery device 310 may store operating level thresholds in the memory 318, and the controller 316 may compare operating levels to respective thresholds. If an operating level threshold is exceeded, the power delivery device 310 controls the secondary power system 182 to share the load of the cooling system. The power delivery device 310 may also consider the energy costs from each energy source. The secondary power system 182 may be connected to a lower cost energy source to achieve a cost savings when an operating level threshold is exceeded.

Also, the aggregate power of the cooling system components may be determined and compared to a threshold by the controller 316. The threshold may be based on the power consumption of the cooling systems components operating at respective operating level thresholds. The threshold, for example, may be the aggregate of the power consumption of the cooling systems components operating at respective operating level thresholds. If this threshold is exceeded, then the power delivery device 310 controls the secondary power system 182 to share the cooling system load.

The workload manager 320 may monitor the workload of the computer systems 152 and 154. This may be accomplished by monitoring the workload as it enters the system and is assigned to a particular computer system. The workload manager 320 may index the workload of each of the computer systems 152 and 154. Based on information pertaining to the workload of each of the computer systems 152 and 154 (e.g., historical power consumption vs. workload measurements), the workload manager 320 may increase or decrease a workload for a computer system accordingly.

The power delivery device 310 may include conventional power measuring circuits 312 and 314. Generally, the power measuring circuits 312 and 314 are provided to measure the power consumption of the load, such as the cooling system 142. The power measuring circuits 312 and 314 may measure the output power of the power system 180 and 182 to determine the power demand of the cooling system 142. Instead of measuring the output power of the power systems 180 and 182, the power demand of the cooling system 142 may be determined by distributing power measuring circuits (e.g., the power measuring circuits 221, 261, and 291 shown in FIGS. 2A–B) throughout the cooling system 142 to determine the power consumption of cooling system components. Other conventional techniques may also be used to determine power consumption of the cooling systems 142 and 144.

Figure 4:
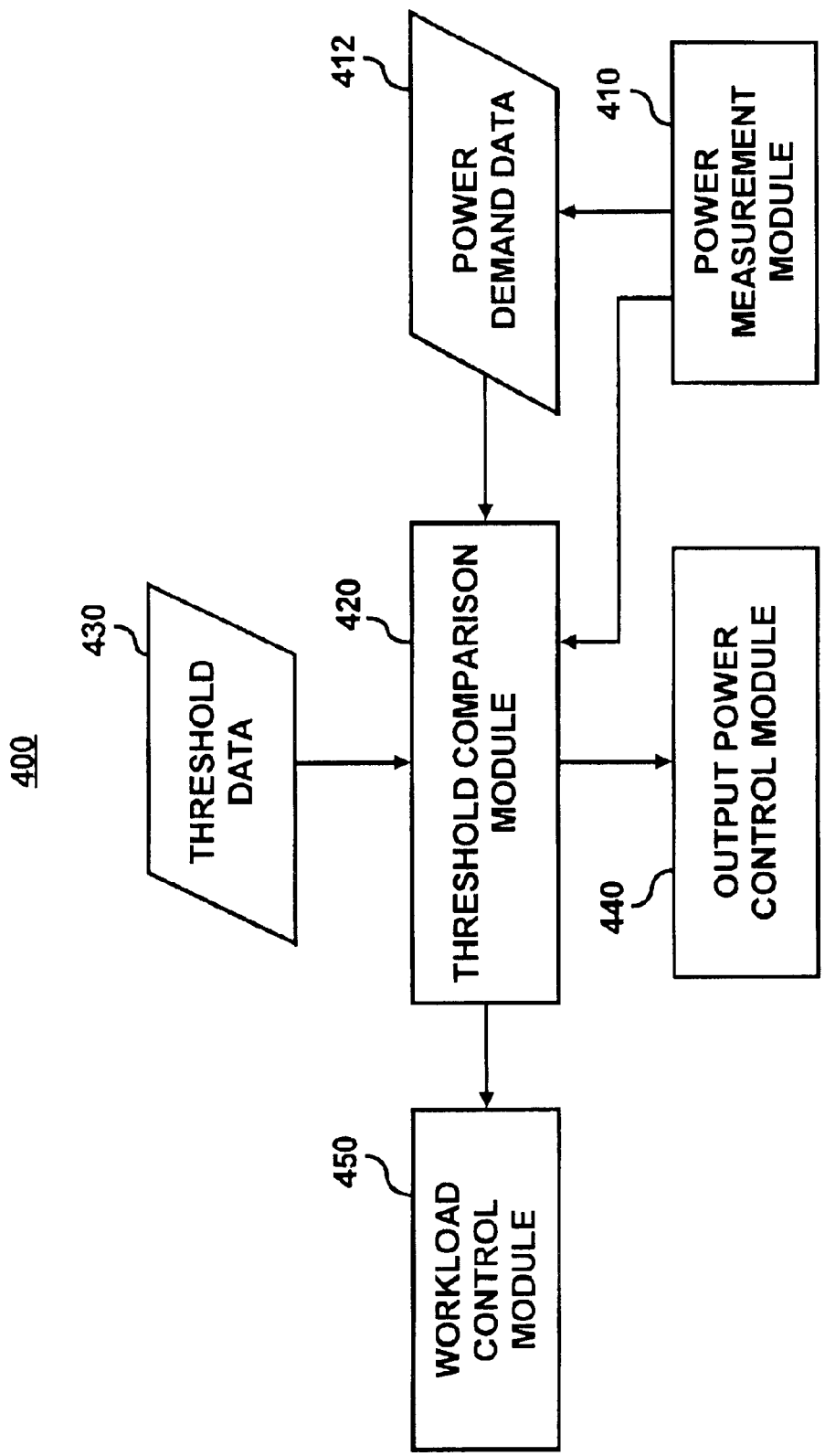
FIG. 4 illustrates a software architecture of a power control device, according to an embodiment of the invention.

FIG. 4 illustrates a software architecture 400 for the power delivery device 310 shown in FIG. 3, according to an embodiment of the invention. It should be readily apparent to those of ordinary skill in the art that the architecture 400 represents a generalized schematic illustration and that other components may be added or existing components may be removed or modified. Moreover, the architecture 400 may be implemented using software components, hardware components, or a combination thereof. Also, the modules of the software architecture 400 may be executed by a controller, ASIC, or other hardware.

The software architecture 400 comprises a power measurement module 410, a threshold comparison module 420, a power output control module 440 and a workload control module 450. The power measurement module 410 measures the power demand of the cooling system 142. For example, the power demand may be measured by the power measurement circuits 312 and 314 shown in FIG. 2, which are connected to the power systems 180 and 182. The power measurement module 410 receives measurements of the power output of the power systems 180 and 182 to determine the power demand of the computer systems 142. In one embodiment, the power measurement circuits 312 and 314 may be connected to a power system component (e.g., PDU 122, power supply 132) directly outputting power to the cooling system 142. These measurements may be stored in the memory 318, shown in FIG. 2, as the power demand data 412. The power demand data 412 may also include operating levels of one or more cooling system components.

The threshold comparison module 420 compares the power demand data 412 to a threshold to determine whether the load on the primary power system 180 should be increased or decreased (e.g., sharing the load with the secondary power system 182). In one embodiment, the threshold is associated with the efficient operating point of the primary power system 180. The threshold may include a power factor threshold and/or an output power threshold. The threshold may be stored in the memory 312, shown in FIG. 2, as the threshold data 212. The threshold data may also include operating level thresholds for the cooling system components.

The threshold may include an upper threshold and a lower threshold. For example, if the upper threshold is exceeded, the secondary power system 182 will share the load with the primary power system 180. If the power consumption of the load falls below a second threshold, the secondary power system 182 may reduce its output power or stop supplying power depending on how low the power consumption falls. The difference between the upper and lower threshold provides a buffer that substantially prevents the secondary power system 182 from continually changing its output power.

When using a power factor for the threshold, power factor data (e.g., calculated from the input power of the power systems 180 and 182), which may also be stored as the power demand data 412, is compared to the power factor threshold by the threshold comparison module 420. If the calculated power factor is below the power factor threshold, then the output power of the primary power system 180 may be increased to achieve its efficient operating point. An upper and lower power factor threshold may also be used.

The threshold data 430 may include one or more output power values. For example, the threshold may include an output power value or range of output power values for the primary power system 180, which may be associated with an efficient operating point of the power system 180, efficiency of the cooling system components, and/or other factors described herein. If the power demand of the computer systems 142 exceeds the threshold, then the load on the primary power system 180 is reduced until the load on the primary power system 180 is approximately equal to or below the threshold. The load on the secondary power system 182 is increased substantially by the same amount the load on the primary power supply is decreased.

The threshold data 430 may also be associated with energy costs. For example, a threshold may be used to limit the output power of the primary power system 180 if the cost of electricity (e.g., generated at the utility 102 shown in FIG. 1) is relatively high when compared to the cost of electricity from the alternative energy source 104, shown in FIG. 1. Then, the load of the cooling system 142 is substantially shifted to the secondary power system 182 using the output power control module 440.

The threshold data 430 may be input, for example, by a system administrator or calculated based on data input by a system administrator (not shown). For example, a system administrator may input efficiency curve data, power factor curve data, and/or energy costs. Then, one or more algorithms may be used to calculate the threshold. Alternatively, the system administrator may pre-calculate the threshold data 430 and input the data to the power delivery device 310. The threshold data 430, for example, may be entered at a system administrator console (not shown) and transmitted to the power delivery device 310 via a network.

The thresh old comparison module 420 invokes the output power control module 440 to control the output power of the power systems 180 and 182. For example, if the threshold comparison module 420 determines that a threshold associated with the output power of the primary power system 180 is exceeded, the threshold comparison module 420 invokes the output power control module 440 to decrease the load of the primary power system 13 and increase the load of secondary power system 182. The output power control module 440 may be connected to circuitry or a controller 184 and 186 (for the power systems 180 and 182 respectively) in the power systems 180 and 182 that is operable to control the output power of the power systems 180 and 182 being supplied to the cooling system 142.

The threshold comparison module 420 may also invoke the workload control module 450 to request a change in workload from the workload manager 320, shown in FIG. 3. For example, if the power demand of the cooling system 142 exceeds the threshold for a sustained, predetermined period of time, then the workload control module 450 may generate a message requesting that the workload manager 420 migrate some of the workload of the computer systems 152 to another computer system to reduce the load of the power system 180 and/or the power system 182. The workload manager 420 may migrate some of the workload of the computer systems 152 to the computer systems 154 to reduce the workload. Also, the workload manager 420 may migrate some of the workload to a more efficient computer system also receiving power from the power systems 180 and 182.

Figure 5A:
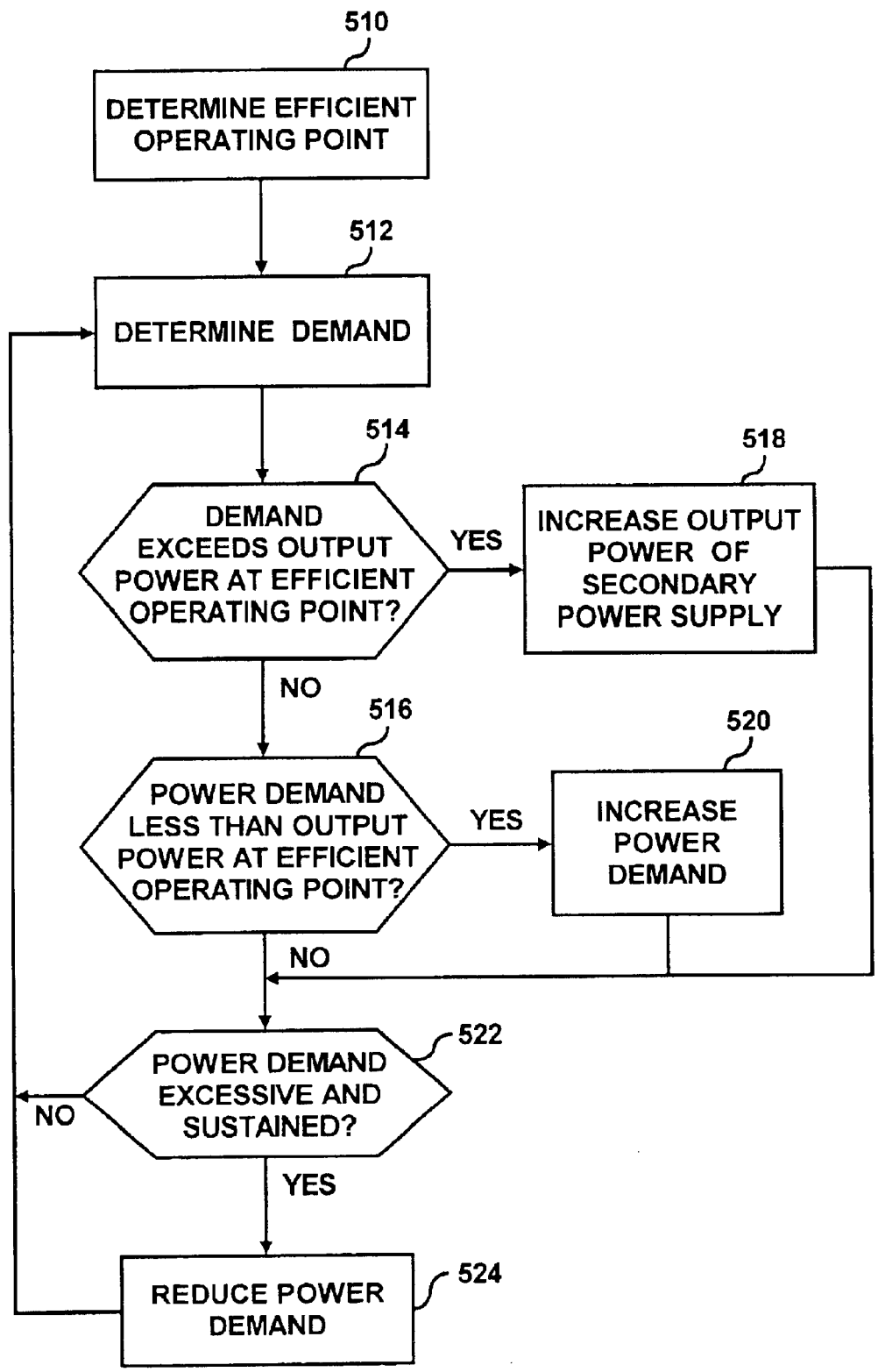
FIGS. 5A–B illustrate flow charts of methods for controlling the power output from at least two power systems, according to embodiments of the invention.

FIG. 5A illustrates a method 500 for controlling the output power of at least two power systems supplying power to a cooling system, according to an embodiment of the invention. The steps of the method 500 are described with respect to the system 300 shown in FIG. 3 by way of example and not limitation. Furthermore, the steps of the method 500 may be performed by software, hardware or a combination thereof.

At step 510, the power delivery device 310 determines an efficient operating point for the primary power system 180. The efficient operating point may be based on one or more of an efficiency curve and/or a power factor curve for one or more components (e.g., power supply 132, PDU 122, UPS 112, etc.) in the primary power system 180. In another embodiment, the efficient operating point of the primary power system 180 may be based on energy costs. For example, an electricity cost-based algorithm may be used to calculate an efficient operating point for the primary power system 180 based on the cost of electricity provided from the utility 102 and the alternative energy source 104 (shown in FIG. 1). If the cost of electricity from the utility 102 is high relative to the cost of electricity from the alternative energy source 104, then the efficient operating point of the primary power system 180 is set such that the majority of the power demand of the computer systems 142 is met by the cheaper power source (e.g., from the alternative energy source 104 via the secondary power system 182). Availability of power from each source may also be considered. The efficient operating point may be changed as parameters affecting the efficient operating point vary.

In yet another embodiment, the efficient operating point of the primary power system 180 may be based on the operating level thresholds of one or more components in the cooling system. For example, the efficient operating point of the primary power system 180 may be based on a threshold associated with an operating level threshold of at least one cooling system component. The efficient operating point may be the power consumption of the at least one cooling system component operating at its operating level threshold. The efficient operating point may include the aggregate or sum of the power consumptions of multiple cooling system components operating at respective operating level thresholds.

At step 512, the power delivery device 310 determines a power demand of the cooling system 142. The power demand may be determined by measuring the output power of the power systems (e.g., the primary power system 180 and the secondary power system 182) supplying power to the cooling system 142. Power measuring circuits may be used to measure output power, or the heat dissipation of the power supplies may be used to determine output power of the power supplies. Alternatively or in addition, the power demand of the cooling system 142 may be determined by measuring the power consumption of cooling system components (e.g., pumps, blowers, compressors, etc.).

At step 514, the power delivery device 310 determines whether the power demand of the cooling system 142 exceeds the output power of the primary power system 180 operating at its efficient operating point. If the power demand of the cooling system 142 exceeds the output power of the primary power system 180, then the secondary power system 182 increases its output power to the cooling system 142 (step 540). For example, the power delivery device 310 increases the load on the secondary power system 182 to an amount approximately equal to the power demand of the cooling system 142 that exceeds the output power of the primary power system 180 operating at its efficient operating point.

At step 516, the power delivery device 310 determines whether the power demand of the cooling system 142 is less than the output power of the primary power system 180 operating at its efficient operating point. If the power demand is less than the output power, then the power demand of the cooling system 142 is increased (step 520). For example, the power delivery device 310 may request the workload manager 320 to increase the workload of the computer systems 152. The workload manager 320 may migrate one or more applications to the computer systems 152, resulting in more heat dissipated by the computer systems 152. The cooling system 142, in turn, uses more power to remove the additional heat dissipated by the computer systems 152. Therefore, the load may be increased on the primary power system 180 such that the primary power system 180 operates at the efficient operating point. At steps 514 and 516, an upper threshold and a lower threshold may be used for the efficient operating point of the primary power system 180. For example, referring to the efficiency curve of FIG. 7, the power supply 132 is most efficient approximately between 450 W and 500 W of output power. At step 514, the power demand of the cooling system 142 may be compared to 500 W to determine whether the power demand exceeds the efficient operating point of the primary power system 180. At step 516, the power demand may be compared to 450 W to determine whether the power demand is less than the efficient operating point. Also, the upper and lower thresholds may be used to prevent the power delivery device 310 from continuously adjusting the load of the power supplies 132 and 134. For example, the upper threshold may include a buffer which is a predetermined amount (e.g., 20 W) above the output power of the power supply 132 operating at its efficient operating point. A similar buffer may be used for the lower threshold.

The threshold has generally been described as an amount of power and/or a power factor. The threshold may also be a power consumption rate of the load. For example, if the rate of power consumption exceeds a predetermined value, the secondary power system 182 may share the load with the primary power system 180. Also, power consumption rate may be used in combination with a power value and/or a power factor value for the threshold. For example, if the rate of power consumption is above a predetermined threshold, and power consumption is above a predetermined value, then the secondary power system 182 may share the load.

At step 522, the power delivery device 310 determines whether the power demand of the cooling system 142 is excessive (e.g., greater than a predetermined threshold) and sustained. Excessive power demand may include power demand that exceeds the output power of the primary power system 80 operating at its efficient operating point and the output power of the secondary power system 182 operating near a maximum output power. If the power demand is excessive and the excessive power demand is sustained for a predetermined period of time, the power demand is reduced (step 524). For example, the power delivery device 310 may request the workload manager 320 to migrate some of the workload of the computer systems 152, resulting in less power used by the cooling system 142 for cooling the computer systems 152. The workload manager 320 may migrate some of the workload to the computer systems 154 (receiving power from different power supplies 136 and 138) or to a more efficient computer system of the computer systems 152.

One or more of the steps of the method 500, such as the steps 512–524, may be repeated substantially continuously, periodically or demand driven. The step 510 of determining efficient operating point may be repeated, for example, when new operating efficiency data (e.g., new efficiency curve, new power factor curve, new energy cost information, etc.) is received. Also, one or more steps of the method 500 may be performed in a different order. For example, the step 512 may be performed before the step 510. Also, the steps 514 and 516 may be performed in a different order. These and other variations to the method 500 will be apparent to one of ordinary skill in the art.

Figure 5B:
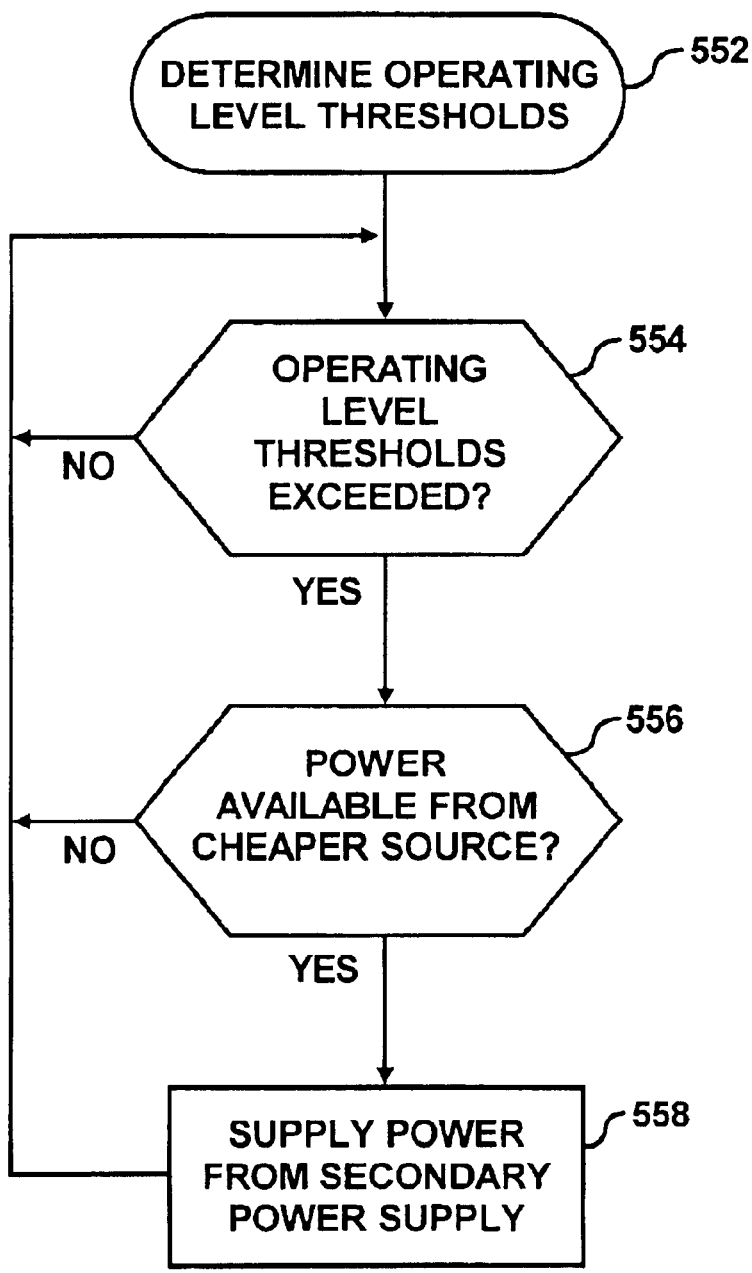
Figure 6:
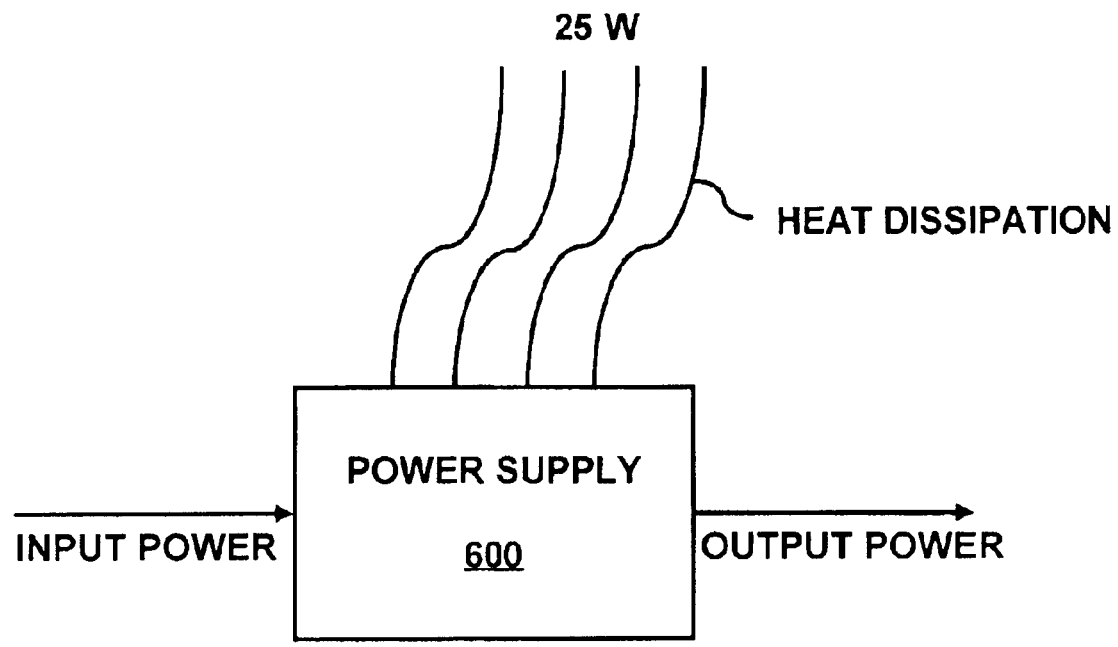
FIG. 6 illustrates a block diagram of a conventional power supply.

FIG. 5B illustrates a method 550 for controlling the output power of power systems supplying power to a cooling system, according to another embodiment of the invention. The steps of the method 550 are described with respect to the system 300 shown in FIG. 3 by way of example and not limitation. Furthermore, the steps of the method 550 may be performed by software, hardware or a combination thereof.

At step 552, operating level thresholds are determined for one or more components in the cooling system. Certain components of a cooling system may be monitored for operating level and/or power consumption. Operating level thresholds may be determined for these components. In an HVAC system including a compressor, pump and/or a blower for cooling computer systems, these components are responsible for a substantial majority of the power demand of the cooling system, and can be monitored to determine the power demand of the cooling system. Other components may also be monitored and operating level thresholds may be determined for those components.

The operating level threshold for a cooling system component may be based on an operating level wherein a significant increase in power consumption results. For example, a vfd blower may operate at different speeds. A higher speed may be required to cool increased dissipation. At certain operating levels, however, the amount of power consumption significantly increases. For example, the vfd blower may require a certain amount of power (e.g., 12 kilowatts (KW)) to operate the blower at its highest speed (also referred to as full capacity). However, to operate the blower at 50% full capacity, the vfd blower may only require 10% of the power (e.g., 1.2 KW) needed to operate the blower at full capacity. This represents a significant power savings in that a 50% reduction in blower speed results in a 90% decrease in power demand by the blower. Thus, a significant increase in power consumption may result at operating levels above 50% capacity. The 50% capacity may be selected as the threshold operating level for the vfd blower. Similarly, threshold operating levels may be selected for other components. Also, power consumption at certain levels may be determined by measurement.

At step 554, the power delivery device 310 determines whether one or more operating level thresholds are exceeded. If an operating level threshold is not exceeded, then step 552 is performed. If an operating level threshold is exceeded, the power delivery device 310 determines whether power from a lower cost energy source is available (step 556). For example, the primary power system 180 may receive power from a conventional power utility. The secondary power system 182 may be connected to an alternative energy source (e.g., wind, solar, etc.) that typically provides power at a cheaper rate than the utility. Also, the amount of power available from the lower cost energy source may be limited. If the amount of power available from the lower cost energy source is, for example, above a predetermined amount, then the secondary power system 182 supplies power to the cooling system.

The amount of power supplied by the secondary power system 182 may be approximately equal to operate the cooling system components when functioning at operating levels above their respective operating level thresholds. Ideally, most of the power demand is met by the lower cost energy source. However, because of the possibility of having a limited amount of power available from the lower cost energy source, power supplied from the lower cost energy source may be provided when the cooling system components function above their respective operating level thresholds. At step 556, if the amount of power available from the lower cost energy source is below the predetermined amount, then step 552 is performed. At step 558, the secondary power system 182 supplies power to the cooling system, possibly in conjunction with the primary power system 180. Accordingly, if one or more operating level thresholds for the cooling system components is exceeded and at least a predetermined amount of power from a lower cost energy source is available, the secondary power system 182 also supplies power to the cooling system.

In another embodiment, the entire cooling system load or a substantial portion of the cooling system load is met by the secondary power system 182, because the secondary power source 134 supplies power at a cheaper rate than the primary power system 180. Alternatively, a smaller portion of the cooling system load is met by the secondary power supply.

One or more of the steps of the method 550 may be performed by controllers controlling the operating level of cooling system components. For example, the contoller 263 shown in FIG. 2B determines the operating level of the blower 292. The controller 263 may also determine whether the operating level exceeds an operating level threshold, then the controller 263 may report to the power delivery device 310 when the operating level is exceeded.

What has been described and illustrated herein are embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims— and their equivalents—in which all terms are meant in their broadest reasonable sense unless otherwise indicated.

What is claimed is:

1. A method of supplying power to at least one cooling system component, the method comprising:
    determining an operating level threshold for the at least one cooling system component, wherein the operating level threshold is one of a plurality of operating levels for the at least one cooling system component; and
    supplying power to meet the power demand of the at least one cooling system component using one or more of a primary power system and a secondary power system based on whether an operating level of the at least one cooling system component exceeds the operating level threshold.

2. The method of claim 1, wherein supplying power to meet the power demand of the at least one cooling system component using one or more of a primary power system and a secondary power system based on whether an operating level of the at least one cooling system component exceeds the operating level threshold further comprises:
    supplying power to meet the power demand of the at least one cooling system component using both the primary power system and the secondary power system in response to the operating level of the at least one cooling system component exceeding the operating level threshold; and
    supplying power to meet the power demand of the at least one cooling system component using the primary power system in response to the operating level of the at least one cooling system component being below the operating level threshold.

3. The method of claim 2, wherein supplying power to meet the power demand of the at least one cooling system component using both the primary power system and a secondary power system in response to the operating level of the at least one cooling system component exceeding the operating level threshold further comprises:
    determining whether power is available from the secondary power system; and
    supplying power using both the primary power system and the secondary power system in response to power from the secondary power system being available.

4. The method of claim 2, wherein supplying power using both the primary power system and a secondary power system further comprises supplying power to the at least one cooling system component using the primary power system and the secondary power system, wherein an amount of power supplied by the secondary power system is approximately equal to a power demand of the at least one cooling system component that exceeds a power demand of the at least one cooling system component operating at the operating level threshold.

5. The method of claim 1, wherein power is supplied at a cheaper rate from the secondary power system instead of the primary power system.

6. The method of claim 1, wherein the operating level threshold is associated with a power consumption efficiency of the at least one cooling system component.

7. The method of claim 1, wherein the operating level threshold is associated with an operating level of the at least one cooling system component whereby power consumption of the at least one cooling system component significantly increases relative to power consumptions at lower operating levels of the at least one cooling system component.

8. The method of claim 1, further comprising:
    determining a power consumption of the at least one cooling system component at the operating level threshold;
    determining a current power demand of the at one cooling system component; and
    supplying power to meet the power demand of the at least one cooling system component further comprises supplying power to meet the current power demand of the at least one cooling system component using both the primary power system and the secondary power system in response to the current power demand exceeding the power consumption of the at least one cooling system component at the operating level threshold.

9. The method of claim 8, wherein determining a power consumption of the at least one cooling system component at the operating level threshold comprises:
    determining a power consumption of each of the at least one cooling system components at their respective operating level thresholds if the at least one cooling system component comprises multiple cooling system components; and
    aggregating the power consumptions of the multiple cooling system components at their respective operating level thresholds.

10. The method of claim 9, wherein determining a current power demand of the at one cooling system component further comprises:
    determining a current power demand of each of the multiple cooling system components; and
    aggregating the current power demands of each of the multiple cooling system components.

11. The method of claim 1, wherein the at least one cooling system component comprise one or more of at least one pump, at least one compressor, and at least one blower.

12. The method of claim 1, wherein the operating level threshold is associated with one or more of a first efficiency of one or more components in the primary power system and a second efficiency of one or more components in the secondary power system.

13. The method of claim 12, wherein the one or more components in either the first power system or the second power system comprises one or more of a power supply, a power distribution unit, an uninterruptible power source, and a power distribution system.

14. The method of claim 12, wherein the first efficiency and the second efficiency are based on one or more of a power factor and efficiency of the one or more components in the first power system and the second power system operating at different output powers.

15. The method of claim 1, wherein supplying power to meet the power demand of the at least one cooling system component using one or more of a primary power system and a secondary power system based on whether an operating level of the at least one cooling system component exceeds the operating level threshold further comprises supplying power to meet the power demand of the at least one cooling system component using one or more of the primary power system and the secondary power system based on a cost of electricity from each of the primary power system and the secondary power system.

16. The method of claim 1, further comprising:
   determining whether a power demand of the at least one cooling system component exceeds an upper threshold or is less than a lower threshold; and
   varying an amount of power supplied from one or more of the primary power system and the secondary power system in response to the power demand exceeding the upper threshold or the power demand being less than the lower threshold.

17. The method of claim 16, further comprising:
   determining whether the power demand of the at least one cooling system component is less than the lower threshold; and
   increasing the power demand of the at least one cooling system component in response to the power demand being less than the lower threshold.

18. The method of claim 17, wherein increasing the power demand of the at least cooling system component comprises migrating workload to at least one computer system being cooled by the at least one cooling system component.

19. The method of claim 16, further comprising:
   determining whether the power demand of the at least one cooling system component exceeds the upper threshold; and
   reducing the power demand of the at least one cooling system component in response to the power demand exceeding the upper threshold for a predetermined period of time.

20. The method of claim 19, reducing the power demand of the at least one cooling system component comprises migrating workload from at least one computer system being cooled by the at least one cooling system component.

21. The method of claim 16, wherein the at least one cooling system component is operable to provide an amount of cooling fluid for cooling at least one computer system based on an amount of heat dissipated by the at least one computer system.

22. The method of claim 1, wherein the primary power system includes a utility and the secondary power system includes one or more of a solar power source, fuel cell, gas-powered power source, wind power source, and a hydro-electric power source.

23. The method of claim 1, further comprising:
   determining whether the operating level of the at least one cooling system component exceeds an upper threshold or is less than a lower threshold; and
   placing one or more components of a computer system cooled by the cooling system in a lower-power state or a higher-power state in response to the operating level threshold of the at least one cooling system component exceeding the upper threshold or being less than the lower threshold.

24. A system comprising:
   a first power system and a second power system operable to supply power to a at least one cooling system component;
   a power delivery control device connected to the first power system and the second power system, wherein the power delivery control device is operable to control an amount of power supplied by the first power system and the second power system to the at least one cooling system component based on an operating level of at least one cooling system component.

25. The system of claim 24, wherein the power delivery control device is further operable to control the amount of power supplied by the first power system and the second power system to the at least one cooling system component based on an efficiency of one or more components in the first power system and the second power system.

26. The system of claim 25, wherein the one or more components comprises at least one of a power supply, a power distribution unit, and an uninterruptible power source, and a power distribution system.

27. The system of claim 24, wherein the power delivery control device is further operable to control the amount of power supplied by the first power system and the to second power system to the at least one cooling system component based on an amount of power available from the second power system.

28. The system of claim 27, wherein the second power system is operable to supply at least a limited amount of power at a cheaper rate than the first power system.

29. The system of claim 24, wherein the power delivery control device is further operable to control the amount of power supplied by the first power system and the second power system to the at least one cooling system component based on a cost of electricity supplied by the first power system and a cost of electricity supplied by the second power system.

30. The system of claim 24, wherein the power delivery control device is operable to supply power to the at least one cooling system component using both the first power system and the second power system in response to a current operating level of the at least one cooling system component exceeding an operating level threshold for the at least one cooling system component; and
   the power delivery control device is operable to supply power using the first power system in response to the current operating level being below the operating level threshold.

31. The system of claim 30, wherein the operating level threshold is based on power efficiency of the at least one cooling system component.

32. The system of claim 30, wherein the operating level threshold is associated with an operating level of the at least one cooling system component whereby power consumption of the at least one cooling system component significantly increases relative to power consumptions at lower operating levels of the at least one cooling system component.

33. The system of claim 30, wherein an amount of power supplied by the secondary power system to the cooling system is approximately equal to a power demand of the at least one cooling system component that exceeds a power demand of the at least one cooling system component operating at the operating level threshold.

34. The power system of claim 30, wherein the power delivery control device is operable to receive the current operating level of the at least one cooling system component from a controller controlling the operating level of the at least one cooling system component, wherein the controller controls the operating level based on an amount of heat dissipated by at least one computer system being cooled by the at least one cooling system component.

35. The power system of claim 34, wherein the power delivery control device is connected to a workload manager, and the power delivery control device is operable to request the workload manager to increase or decrease the workload of the at least one computer system cooled by the at least one cooling system component in order to increase or decrease a load on the at least one cooling system component.

36. The power system of claim 30, wherein the power delivery control device is operable to determine the current operating level of the at least one cooling system component based on a measured power consumption of the at least one cooling system component.

37. The system of claim 24, wherein the at least one cooling system component comprises a component in a refrigeration system, an air-cooled system, and a water-cooled system.

38. A power delivery control device controlling an amount of power supplied by a first power system and a second power system to at least one cooling system component, the device comprising:
   a memory configured to store at least one threshold associated with an efficient operating point of the at least one cooling system component; and
   a power control circuit configured to compare one or more of power consumption of the at least one cooling system component and an operating level of the at least one cooling system component to the at least one threshold, wherein the power control circuit is further configured to control the amount of power supplied by the first power system and the second power system to the at least one cooling system component based on the comparison to the at least one threshold.

39. The device of claim 38, wherein the power control circuit is operable to receive an operating level of the at least one cooling system component from a controller controlling the operating level of the at least one cooling system component, wherein the controller controls the operating level based on an amount of heat dissipated by at least one computer system being cooled by the at least one cooling system component.

40. The device of claim 38, further comprising:
   power measuring circuits for measuring an amount of power supplied by the first power system and an amount of power supplied by the second power system to the at least one cooling system component to determine the power consumption of the at least one cooling system component.

41. The device of claim 38, wherein the power control circuit is operable to control the amount of power supplied by the first power system and the second power system to the at least one cooling system component based on a cost of electricity supplied by each of the first power system and the second power system.

42. A system comprising:
   cooling system component means for cooling at least one computer system;
   means for determining an operating level threshold for the cooling system component means, wherein the operating level threshold is one of a plurality of operating levels for the cooling system component means; and
   means for supplying power to meet the power demand of the cooling system component means using one or more of a primary power source means and a secondary power source means based on whether an operating level of the cooling system component means exceeds the operating level threshold.

43. The system of claim 42 further comprising:
   means for determining whether power is available from the secondary power source means; and
   the means for supplying power is operable to supply power to the cooling system component means using both the primary power source means and the secondary power source means in response to power from the secondary power source means being available and the operating level exceeding the operating level threshold.

44. The method of claim 42, further comprising:
   means for determining a cost of electricity from the primary power source means and the secondary power source means; and
   the means for supplying power is operable to supply power to the cooling system component means based on the cost of electricity from the primary power source means and the secondary power source means.

45. The system of claim 42, wherein the operating level threshold is based on a power efficiency of the cooling system Component means.

* * * * *